May 2, 1950

E. L. C. WHITE 2,506,124

CIRCUIT ARRANGEMENT FOR INDICATING THE
DURATION OF ELECTRICAL PULSES

Filed July 13, 1946

INVENTOR.
Eric Lawrence Casling White
BY H. G. Grover
Attorney

Patented May 2, 1950

2,506,124

UNITED STATES PATENT OFFICE 2,506,124

CIRCUIT ARRANGEMENT FOR INDICATING THE DURATION OF ELECTRICAL PULSES

Eric Lawrence Casling White, Iver, England, assignor to Electric and Musical Industries, Limited, a British company Application July 13, 1946, Serial No. 683,310
In Great Britain March 28, 1944

Section 1, Public Law 690, August 8, 1946
Patent expires March 28, 1964

2 Claims. (Cl. 250—27)

This invention relates to circuit arrangements for indicating the duration of electrical pulses.

It is sometimes required to measure the duration of recurrent electrical pulses, for example, in the reception of recurrent pulses which are varied in duration in accordance with a modulating signal. This may be accomplished by limiting the pulses to constant amplitude and feeding them to the control electrode of a thermionic valve, the mean anode current of said valve being a measure of the duration of the pulses. The amplitude of the anode current variations in response to variations in the duration of the pulses in arrangements of this kind is of course directly proportional to the amplitude of the limited pulses, so that considerable amplification will in general be required if a large output is desired. Furthermore, the mean current does not depend only on the pulse duration but also on the repetition frequency.

For the separation of pulses of different duration in the reception of television it has been proposed to cause the pulses to render a valve non-conducting so as to cause an integrating circuit, which may for example, comprise a source of voltage with a resistance and a condenser connected in series across it, to become operative. Thus, the condenser commences to charge when any particular pulse arrives and continues to charge until that pulse ceases, after which the condenser is discharged by said valve. In this way, voltages are developed across the condenser which are proportional to the duration of applied pulses and arrangements, such as biassed diodes, have been associated with a condenser in such arrangements so as to feed a signal to further apparatus when the voltage across said condenser rises above a predetermined value. Arrangements of this kind lend themselves to the indication or measurement of the duration of pulses of variable duration and have the advantage that the output is independent of the amplitude and the rate of recurrence of the pulses and can be made large by the choice of a suitable integrating circuit.

It is the object of the present invention to provide arrangements of this kind giving an output which is directly proportional to the duration of applied pulses but substantially independent of their rate of recurrence and which can be of larger amplitude than is the case with arrangements hitherto proposed for the indication of the duration of pulses.

According to the present invention there is provided a circuit arrangement for indicating the duration of electrical pulses which comprises an integrating circuit normally inoperative but arranged to be rendered operative whenever a pulse is present for the duration of said pulse and a peak rectifier associated with said integrating circuit so as to develop an output proportional to said duration.

In order that the nature of the invention may be more clearly understood it will now be described in greater detail by way of example with reference to the accompanying drawings in which.

Figure 1:
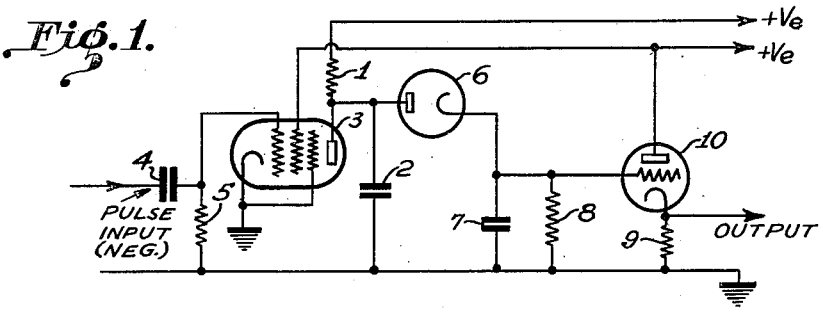
Figure 1 shows a circuit arrangement according to the invention.

Referring to Figure 1 of the accompanying drawings, it will be seen that the circuit arrangement comprises an integrating circuit constituted by resistance 1 and capacity 2 connected in series across a source of charging voltage (not shown). A valve 3 is connected in shunt with capacity 2 and the pulses of variable duration are applied via grid condenser 4 and grid leak 5 to the control electrode of valve 3, the arrangement being such that valve 3 is normally conducting but is rendered non-conducting whenever a negative pulse is applied to its control electrode. Thus, condenser 2 is normally maintained in a discharged condition by valve 3, but whenever a pulse arrives, valve 3 insulates and condenser 2 is permitted to charge to an extent determined by the duration of the applied pulse. The voltage developed across condenser 2 is therefore a measure of the duration of any applied pulse and is substantially independent of the rate of recurrence of said pulses.

The voltage developed across condenser 2 is measured by means of diode 6 which is connected in series with an output load comprising condenser 7 and resistance 8 in parallel across condenser 2. The time constant of condenser 7 and resistance 8 is arranged to be large compared with the longest time interval between successive applied pulses, so that the voltage across condenser 7 will always be proportional to the peak voltage developed across condenser 2 as a result of the charging thereof which takes place during the occurrence of the applied pulses. As the value of resistance 8 may have to be large in practice, the output is not taken directly from it but is instead taken from the output resistance 9 of a cathode follower valve arrangement including valve 10, the control electrode of which is connected to the upper end of resistance 8. The output voltage developed across resistance 9 will therefore be proportional to the duration of the incoming pulses and will reproduce any modulation of the duration of said pulses.

The above arrangement suffers from the disadvantage that when the integrating circuit comprising resistance 1 and condenser 2 is operative, the voltage across condenser 2 increases exponentially with time and is therefore not linearly related to the duration of the applied pulses. This difficulty may to some extent be overcome by limiting the rise of voltage across condenser 2 to a small fraction of the voltage of the source of charging voltage but this requires that the voltage of said source shall be very great if the voltage across condenser 2 is to be permitted to rise to sufficiently large values to enable an output voltage of satisfactory amplitude to be developed across resistance 9. It is therefore preferred to cause the increase of voltage across condenser 2 to be linear by other means not requiring a source of inconveniently high voltage.

Figure 2:
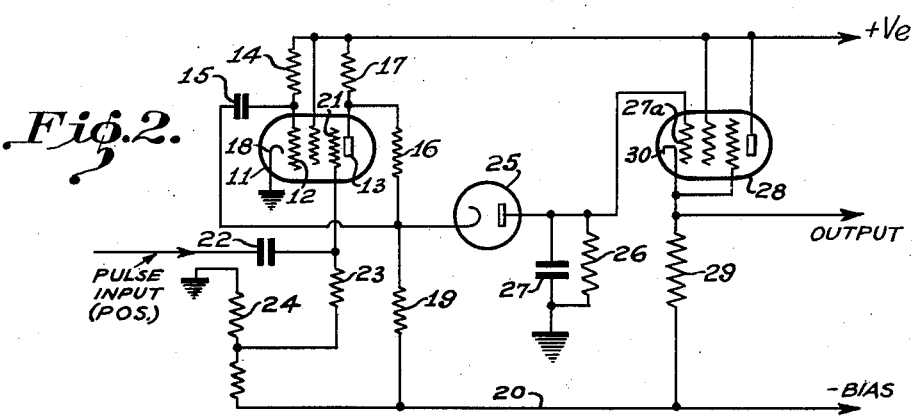
Figure 2 shows a further circuit arrangement according to the invention.

Referring now to Figure 2, it will be seen that the integrating circuit has been associated with a valve having negative feedback in such a way to ensure the desired linearity. The arrangement comprises valve 11 having its control electrode 12 and anode 13 associated with an integrating circuit comprising resistance 14, condenser 15 and resistances 16 and 17. The upper ends of resistances 14 and 17 are connected to a source of charging voltage (not shown) and the cathode 18 of valve 11 is connected to the negative pole of said source which is shown earthed. The lower end of resistance 14 is connected to one electrode of condenser 15 and also to control electrode 12, while the other electrode of condenser 15 is connected to one end of resistance 16 and also to one end of resistance 19, the other end of which is taken to the negative pole 20 of a source of negative bias (not shown), the positive pole of which is connected to cathode 18. The other end of resistance 16 is connected to the anode 13 and to the lower end of resistance 17. Valve 11 is provided with a screen grid which is connected to a suitable positive voltage and also with a further control electrode 21, which may be the outermost grid of a pentode valve. The incoming pulses are applied to electrode 21 via the grid condenser 22 and electrode 21 is biassed to a suitable steady voltage by means of leak 23 connected to a suitable tapping on resistance 24 connected between the cathode 18 and the source of negative bias 20. The voltages applied to valve 11 are so arranged that electrode 21 is normally so negative as to render said valve non-conducting. When, however, a pulse is applied in the positive sense to condenser 22 it raises the voltage of electrode 21 sufficiently to cause valve 11 to assume conductivity, whereupon the voltage of anode 13 decreases linearly with time due to the charging of condenser 15 by the charging current flowing through resistance 14, the latter current being held substantially constant as a result of the negative feedback from anode 13 to control electrode 12 via condenser 15 which resists any change of voltage of electrode 12. Thus, the voltage on the common point of resistances 16 and 19 will decrease linearly with time while the pulse is present and the minimum value of this voltage will be linearly related to the duration of said pulse. This minimum voltage is measured by means of the diode 25 and its associated output circuit consisting of resistance 26 and capacity 27 in parallel therewith, the diode 25 being arranged with its cathode connected to the junction of resistances 16 and 19 so as to pass current on the negative peaks of the voltage developed at said junction. Resistance 26 is connected to the control electrode 27a of a cathode follower valve 28 having an output resistance 29 arranged in its cathode circuit so that an output voltage is developed at the cathode 30 of valve 28 which is directly proportional to the duration of the incoming pulses and which is substantially independent of the rate of recurrence of said pulses.

Figure 3:
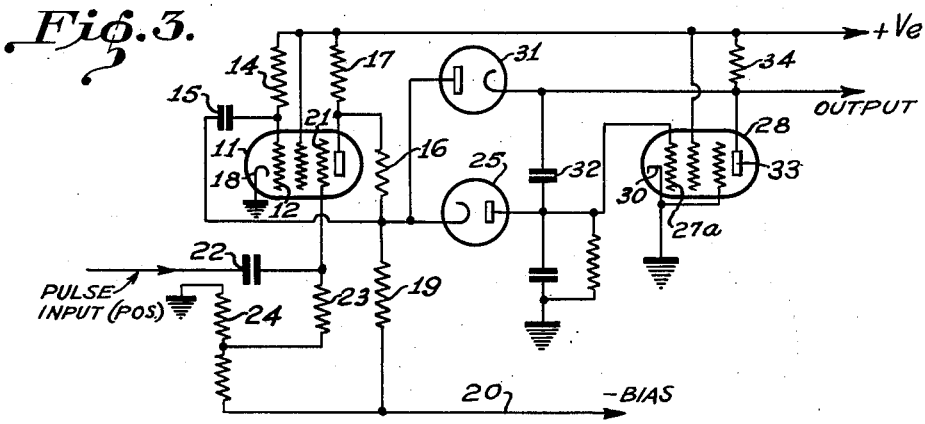
Figure 3 shows a circuit arrangement of a modification of the form of the invention illustrated in Figure 2.

The circuit arrangement shown in Figure 3 differs from that shown in Figure 2 in that instead of the integration commencing at a fixed voltage and terminating at a voltage proportional to the duration of the pulses, the integration is arranged to commence from a variable voltage and to terminate at a substantially fixed voltage so that the change in the voltage from which integration commences is proportional to the duration of the pulses. Elements in Figure 3 which correspond to elements of Figure 2 have been given the same numerals and it will be seen that the two arrangements differ in that in the arrangement of Figure 3 an additional diode 31 and capacity 32 have been provided and the output is now taken from the anode 33 across resistance 34. The anode of diode 31 is connected to the cathode of diode 25 while the cathode of diode 31 is connected to anode 33 and to one electrode of condenser 32, the other electrode of which is connected to the anode of diode 25. The operation of the arrangement of Figure 3 differs from the operation of the arrangement of Figure 2 in that the voltage from which the junction of resistances 16 and 19 commences to fall when a pulse arrives is no longer fixed but is determined by the voltage of the anode 33 of the output valve 28. If, for example, the duration of the incoming pulses increases, control electrode 27a tends to go more negative and the voltage of anode 33 rises and, due to the consequent rise in voltage of the anode of diode 31, it is an increased voltage that is the voltage from which the next charging cycle will commence. Thus, supposing the duration of the applied pulses remains constant, the next pulse will not lower the cathode of diode 25 to the same extent and the result will be that an equilibrium is set up with the voltage of control electrode 27a only slightly more negative than when the pulses were initially applied, and the output voltage at anode 33 therefore rises with increasing pulse duration, almost to the full amount of the integrated voltage across condenser 15.

Although the invention has been described with reference to integrating circuits comprising resistances and capacities it will be appreciated that other forms of integrating circuits such as inductances and resistances may be used if desired.

I claim as my invention:

1. A circuit arrangement for indicating the duration of electrical pulses which comprises an integrating circuit that is normally inoperative, said integrating circuit comprising a condenser and means for feeding said condenser with a constant current, means for rendering said integrating circuit operative in response to the application of a pulse thereto for the duration of said pulse, means comprising a peak rectifier connected to said condenser of the integrating circuit for developing an output proportional to the peak voltage developed across said condenser, and means for causing the output of said rectifier to control the voltage from which the next cycle of said integration commences whereby in operation the voltage at the termination of said integration becomes stabilized and the change in the voltage from which said integration commences is proportional to said duration.

2. A circuit arrangement for indicating the duration of electrical pulses which comprises an integrating circuit that is normally inoperative, said integrating circuit comprising a thermionic valve having a control electrode and an output electrode, said valve being biased so that it is normally non-conducting, a condenser, means for feeding said condenser with a constant current, said condenser being connected between said control electrode and said ouput electrode whereby negative feedback is provided to render said integration more linear, means for rendering said valve conducting and said integrating circuit operative for the duration of a pulse in response to the application of said pulse to said valve, means comprising a peak rectifier connected to said integrating circuit for developing an output proportional to the peak voltage developed across said condenser, and means for causing the output of said rectifier to control the voltage from which the next cycle of said integration commences whereby in operation the voltage at the termination of said integration becomes stabilized and the change in the voltage from which said integration commences is proportional to said duration.

ERIC LAWRENCE CASLING WHITE.

REFERENCES CITED

The following references are of record in the file of this patent:

UNITED STATES PATENTS

| Number | Name | Date |
|--------|------|------|
| 2,210,523 | Blumlein | Aug. 6, 1940 |
| 2,359,447 | Seeley | Oct. 3, 1944 |
| 2,412,485 | Whitely | Dec. 10, 1946 |